March 9, 1926. 1,576,315
P. DUFOUR
SELF STARTER FOR MOTOR VEHICLES
Filed June 26, 1925  3 Sheets-Sheet 1

March 9, 1926. 1,576,315
P. DUFOUR
SELF STARTER FOR MOTOR VEHICLES
Filed June 26, 1925  3 Sheets-Sheet 2
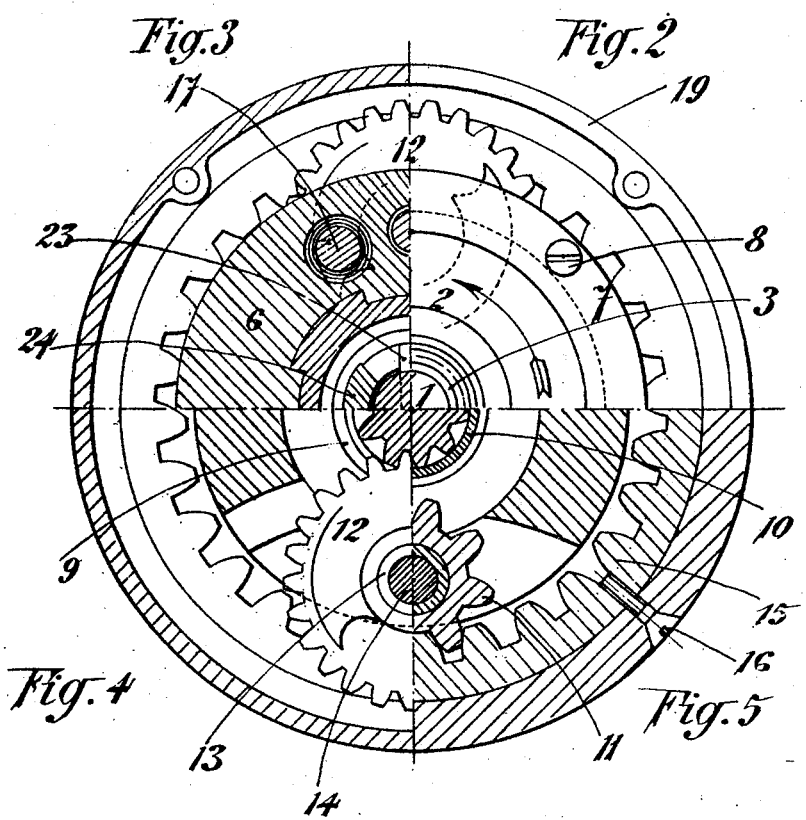

March 9, 1926.  1,576,315
P. DUFOUR
SELF STARTER FOR MOTOR VEHICLES
Filed June 26, 1925    3 Sheets-Sheet 3

Inventor
Paul Dufour

Patented Mar. 9, 1926.

1,576,315

UNITED STATES PATENT OFFICE.

PAUL DUFOUR, OF BELFORT, FRANCE, ASSIGNOR TO SOCIETE ANONYME POUR L'EQUIPE-MENT ELECTRIQUE DES VEHICULES, OF ISSY-LES-MOULINEAUX, FRANCE, A JOINT-STOCK COMPANY OF FRANCE.

SELF-STARTER FOR MOTOR VEHICLES.

Application filed June 26, 1925. Serial No. 39,707.

*To all whom it may concern:*

Be it known that I, PAUL DUFOUR, a subject of the Kingdom of Belgium, residing at 4 Faubourg de Paris, Belfort, France, have invented certain new and useful Improvements in Self-Starters for Motor Vehicles, of which the following is a specification.

The improved reducing gear forming the subject of the present invention is interposed between the shaft of the dynamo and that of the internal combustion engine. The object of the invention is to enable a generator-starter of relatively small power easily to start an internal combustion engine presenting a relatively opposing large couple.

In principle, when the driving shaft is that of the internal combustion engine, the dynamo as generator is directly driven and when the driving shaft is that of the dynamo as motor, such shaft drives the internal combustion engine through the medium of a reduction gear.

The gear according to the invention is characterized essentially by the planet pinion of a planetary train interposed between the shaft of the dynamo and the shaft of the internal combustion engine being connected to a nut screwing along a screw the axis of which is parallel to the axis of the dynamo, so that such planet pinion, in sliding parallel to such axis, assumes two successive positions, the one in which the planet pinion rolls on the stationary planetary track ring (for starting, the dynamo acting as receiver of current) and the other in which the planet leaves the planetary track ring and by its displacement effects direct engagement between the shaft of the internal combustion engine and the dynamo (for normal running, the dynamo acting as generator).

In the accompanying drawings showing, by way of example, a constructional example of a reducing gear according to my invention and in the position of driving the internal combustion engine by the starter, Fig. 1 is a longitudinal section of the contrivance.

Fig. 2 is a quarter end elevation with the cover 20 and the coupling 4 removed.

Fig. 3 is a quarter transverse section taken along the plane *a a* Fig. 1.

Fig. 4 is a quarter transverse section taken along the plane *b b* Fig. 1.

Fig. 5 is a quarter transverse section taken along the plane *c c* Fig. 1.

Figure 1:
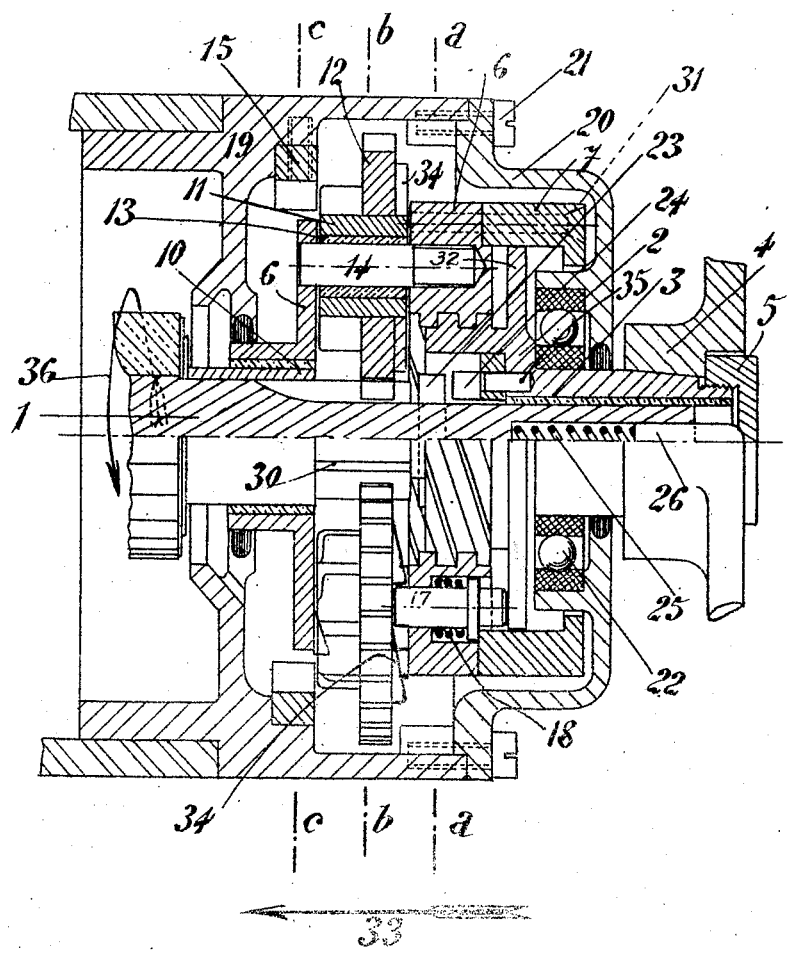

In these figures, 1 is the shaft of the dynamo, which shaft can turn freely in the bronze bearing bush 3 of the screw 2. The shaft 1 has spur teeth 30 cut therein.

The screw 2 is coupled by the coupling flange 4 to the internal combustion engine. It has a quick screw thread on which screws a planet carrier 6. This carrier at its other end is supported through an interposed bronze bearing bush 9, on a steel sleeve 10 tightly fitted over the shaft 1 of the dynamo.

The planet carrier 6 carries, for instance by screws 31, an abutment collar 7 which can come into engagement with an abutment disc 32 of the screw 2, which limits the axial displacements of the planet carrier 6 in the direction of the arrow 33 as hereinafter explained.

The planet carrier 6 carries two pairs of planet wheels by their spindles 14. Each pair of planet wheels consists of a pinion 11 provided internally with a bronze bearing bush 13 and providing a spindle to receive the other planet wheel 12 which is socketed tightly on the first and is locked thereon by a suitable key.

The planet wheel 12 presents laterally two ratchet teeth 34.

In the planet carrier 6, opposite the ratchet teeth 34 of the planet wheels 12 is formed a recess in which is located a plunger 17 thrust by a spring 18.

The teeth of the pinion 11 can gear with a toothed planetary track ring 15 secured to the casing 19 by screws 16.

Finally the shaft 1 of the dynamo carries at its end a lug 23 which can engage in the claws of a ring 24 socketed in the screw 2 and fixed thereto by pegs 35.

The above described contrivance operates in the following manner:

1. Acting as starter.

The various elements of the mechanism initially occupy the positions indicated in Fig. 1.

The circuit of the battery of accumulators is closed through the dynamo which then operates as a receiver of current and thus turns its shaft 1 in the direction of the arrow 36.

This shaft drives by its pinion 30 the planet wheels 12 and tends to cause them to rotate. The ratchet teeth 34 of the planet wheels 12 tend to ride up the plungers 17 which abut against the abutment disc 32 of the screw 2. The reaction of these plungers against the planet wheels 12 and consequently against the planet carrier 6 is therefore directed along the arrow 33 and results in starting the planet carrier 6 along the screw 2. The carrier therefore traverses the screw 2 in the direction the arrow 33.

At the instant when the plungers 17 are disengaged from the teeth 34 of the wheels 12, the teeth of the pinions 11 come into gear with the planetary track ring 15 and the planet carrier 6 becomes unscrewed from the part 2 until its collar 7 comes into engagement with the abutment disc 32 and arrests the movement. At this instant, the various elements of the contrivance occupy the positions indicated in Fig. 6. The driving effort is transmitted from the teeth 30 of the shaft 1 to the planet carrier 6 by the intermediary of the planet wheels 12 which drive against the stationary planetary track ring 15. The carrier therefore drives the internal combustion engine with a reduced speed. Electric starting of the internal combustion engine is thus effected.

2. Dynamo acting as generator.

Figure 6:
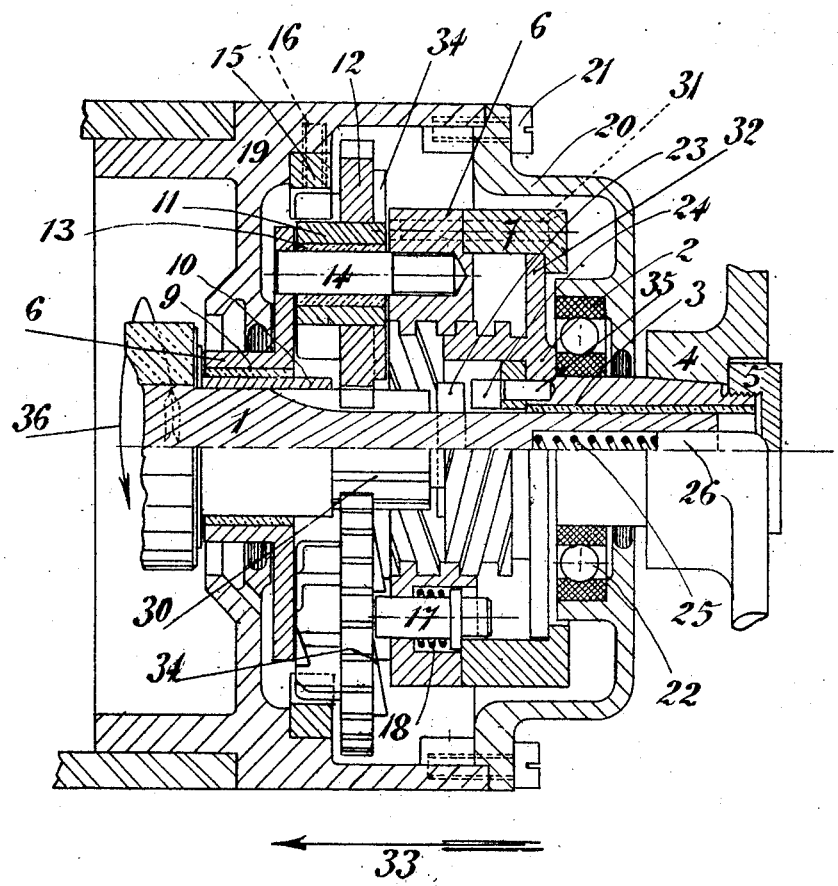
Fig. 6 is a section similar to that of Fig. 1, but corresponding to another phase of the operation of the contrivance.

As soon as the engine has started, the screw 2 becomes a driver such that the reactions between the screw threads of the screw and of the planet carrier 6 change their direction. The carrier then screws to the end along the screw 2 displacing itself in the direction opposite to the arrow 33. The teeth of the planet pinions 11 disengage from those of the planetary track 15. The two plungers 17 abut against the disc 32 of the screw 2, compress the returning springs 18 and enter into engagement with the teeth 34 of the planet wheels 12, which prevents any rotation of such planet wheels about their spindles 14. The screw 2, the planet carrier 6 and the shaft 1 of the dynamo therefore become locked as one block. The engine is in direct engagement with the dynamo which thus operates as a generator and charges the battery of accumulators (Fig. 6).

3. Starting by hand.

If the dynamo or the battery of accumulators are out of action, which renders electric starting of the internal combustion engine impossible, a crank is applied to the shaft 1 of the dynamo and an impulse is exerted on this shaft in the direction opposite to the arrow 33, such that the lug 23 of the shaft 1 engages in the claws 24 of the screw 2. Thus a direct coupling of the shaft of the dynamo with the shaft of the internal combustion engine is effected. The latter is then turned which thus effects the starting of the internal combustion engine.

Numerous modifications can of course be made in the contrivance described above by way of example, without a departure from the spirit and essence of the invention, and, therefore, I do not limit myself to the construction as shown on the drawing.

It is obvious that instead of mounting the gear within the bearing casing of the dynamo, it may be separated from the latter or incorporated with the internal combustion engine.

I claim:—

1. In a gear for starting the engine of a motor vehicle, the combination of the dynamo shaft, the engine shaft, a planetary train comprising a central pinion, a planet wheel and a planetary track ring interposed between said dynamo shaft and said engine shaft, a screw parallel with the dynamo shaft, means connecting said screw to said engine shaft, a nut screwing on said screw, means connecting said nut to said planet wheel so that said planet wheel is fast with said nut in its translations parallel to the dynamo shaft and can thus escape from said planetary track ring, means operated by said planet wheel as it escapes by translation from said planetary track ring, the said means effecting direct engagement of said dynamo shaft and said engine shaft.

2. In a gear for starting the engine of a motor vehicle the combination of the dynamo shaft, the engine shaft, a planetary train comprising a central pinion, a planet wheel and a planetary track ring interposed between said dynamo shaft and said engine shaft, a screw parallel to said dynamo shaft and fast with the engine shaft, a carrier screwed on said screw and carrying the spindle of said planet wheel so that said planet wheel is fast with said carrier in its translations parallel to the axis of said dynamo shaft and can thus escape from said planetary track ring, means operated by said planet wheel as it escapes by translation from said planetary track ring, the said means effecting the direct engagement of said dynamo shaft and said engine shaft.

3. In a gear for starting the engine of a motor vehicle the combination of the dynamo shaft, the engine shaft, a planetary train comprising a central pinion, a planet wheel and a planetary track ring interposed between said dynamo shaft and said engine shaft, a screw parallel to the axis of said dynamo shaft, means connecting said screw to said engine shaft, a nut screwing on said screw, means connecting said nut to said planet wheel so that said planet wheel is fast with said nut in its translations parallel to the axis of said dynamo shaft and can thus escape from said planetary track ring, means coming into engagement with said planet wheel as it escapes by translation from said planetary track ring, said means then locking said planet wheel on its spindle such that all the elements of said planetary train are locked forming a single unit turning about the axis of the dynamo and thus effecting the direct engagement of said dynamo shaft and said engine shaft.

4. In a gear for starting the engine of a motor vehicle the combination of the dynamo shaft, the engine shaft, a planetary train comprising a central pinion, a planet wheel and a planetary track ring interposed between said dynamo shaft and said engine shaft, a screw parallel to the axis of said dynamo shaft, means connecting said screw to said engine shaft, a nut screwing on said screw, means connecting said nut to said planet wheel so that said planet wheel is fast with said nut in its translations parallel to the axis of said dynamo shaft and can thus escape from said planetary track ring, plungers adapted to abut on said screw sliding in said nut, carrying said planet wheel and coming into engagement with said planet wheel, as said planet wheel escapes by translation from said planetary track ring, said plungers then locking said planet wheel on its spindle so that all the elements of said planetary train are locked forming a single unit adapted to turn about the axis of said dynamo shaft thus effecting the direct engagement of said dynamo shaft with said engine shaft.

5. In a gear for starting the engine of a motor vehicle the combination of the dynamo shaft, the engine shaft, a planetary train comprising a central pinion, a planet wheel and a planetary track ring interposed between said dynamo shaft and said engine shaft, a screw parallel to the axis of said dynamo shaft, an abutment fast with said screw, a nut screwing on said screw, a prolongation fast with said nut and coming into engagement with said abutment fast with said screw so as to limit the longitudinal translations of said nut, means connecting said nut to said planet wheel so that said planet wheel is fast with said nut in its translations parallel to the axis of said dynamo shaft and thus can ecsape from said planetary track ring, means operated by said planet wheel as it escapes by translation from said planetary track ring, said means effecting the direct engagement of said dynamo shaft and said engine shaft.

6. In a gear for starting the engine of a motor vehicle the combination of the dynamo shaft, the engine shaft, a planetary train comprising a central pinion, a planet wheel and a planetary track ring interposed between said dynamo shaft and said engine shaft, a screw parallel to the axis of said dynamo shaft, an abutment fast with said screw, a nut screwing on said screw, a prolongation fast with said nut and coming into engagement with said abutment so as to limit the longitudinal translations of said nut, plungers coming to strike against said abutment and sliding in said nut carrying said planet wheel and coming into engagement with said planet wheel as said planet wheel escapes by translation from said planetary track ring, said plungers then locking said planet wheel on its spindle so that all the elements of said planetary train are locked forming a single unit adapted to turn about the axis of said dynamo shaft and thus effecting the direct engagement of said dynamo shaft and said engine shaft.

7. In a gear for starting the engine of a motor vehicle the combination of the dynamo shaft, the engine shaft, a pinion on said dynamo shaft, a planet wheel gearing with said pinion, a spindle carrying said planet wheel, a planet pinion fast with said planet wheel and carried by said spindle, a stationary planetary track ring adapted to be engaged by said planet pinion, a screw parallel to said dynamo shaft and connected to said engine shaft, a nut screwing on said screw, means connecting said nut to said spindle, so that said spindle is fast with said nut in its translations parallel to the axis of said dynamo shaft, which permits said planet pinion to escape by translation from said planetary track ring, and means operated by said planet wheel as it escapes by translation from said planetary track ring so as to effect the direct engagement of said dynamo shaft and said engine shaft.

In testimony whereof I affix my signature.

PAUL DUFOUR.